(12) United States Patent
Kurtz

(10) Patent No.: US 8,112,986 B2
(45) Date of Patent: Feb. 14, 2012

(54) MANAGING REDUCTANT SLIP IN AN INTERNAL COMBUSTION ENGINE

(75) Inventor: Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 595 days.

(21) Appl. No.: 12/206,999

(22) Filed: Sep. 9, 2008

(65) Prior Publication Data

US 2010/0058740 A1   Mar. 11, 2010

(51) Int. Cl.
*F01N 3/00* (2006.01)
*F01N 3/10* (2006.01)

(52) U.S. Cl. ............... 60/285; 60/274; 60/286; 60/295; 60/301

(58) Field of Classification Search ............ 60/273, 60/274, 276, 285, 286, 295, 301, 303
See application file for complete search history.

(56) References Cited

U.S. PATENT DOCUMENTS

| | | | |
|---|---|---|---|
| 6,415,602 B1 | 7/2002 | Patchett et al. | |
| 6,442,932 B1 | 9/2002 | Hofmann et al. | |
| 6,882,929 B2 | 4/2005 | Liang et al. | |
| 2004/0098974 A1 * | 5/2004 | Nieuwstadt et al. | 60/286 |
| 2005/0282285 A1 | 12/2005 | Radhamohan et al. | |
| 2006/0263285 A1 * | 11/2006 | Pollington et al. | 423/239.1 |
| 2007/0144152 A1 | 6/2007 | Lueders | |
| 2008/0103684 A1 * | 5/2008 | Allmer et al. | 701/114 |
| 2008/0202097 A1 * | 8/2008 | Driscoll et al. | 60/274 |
| 2009/0288394 A1 * | 11/2009 | Kesse et al. | 60/286 |
| 2010/0050614 A1 * | 3/2010 | Parmentier et al. | 60/287 |

FOREIGN PATENT DOCUMENTS

| | | | |
|---|---|---|---|
| DE | 10043798 A1 * | 3/2002 | |
| WO | WO 2008009940 A2 * | 1/2008 | |
| WO | WO 2008026002 A1 * | 3/2008 | |

OTHER PUBLICATIONS

Weirich, English Translation of DE 10043798 A1, Mar. 14, 2002.*

* cited by examiner

*Primary Examiner* — Thomas Denion
*Assistant Examiner* — Audrey K Bradley
(74) *Attorney, Agent, or Firm* — Julia Voutyras; Alleman Hall McCoy Russell & Tuttle LLP

(57) ABSTRACT

A method for controlling operation of vehicle system including an internal combustion engine and a catalytic emission control device coupled in an exhaust of the engine, the method including delivering, which may include injecting into the exhaust, reductant to the emission control device responsive to vehicle operating conditions, and increasing emission control device inlet-NOx in response to reductant release from the emission control device.

18 Claims, 6 Drawing Sheets

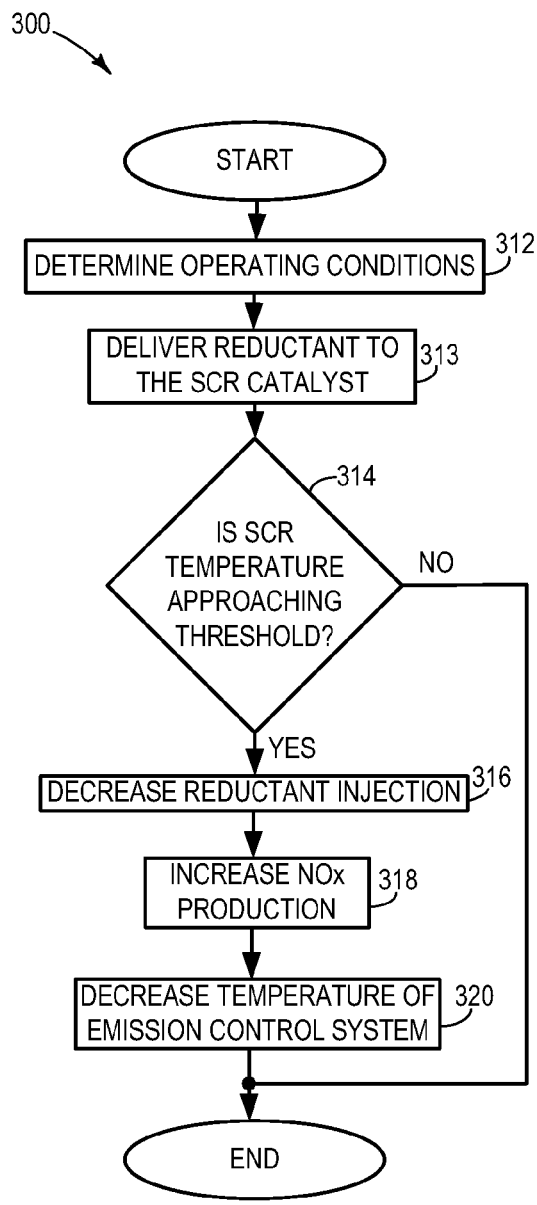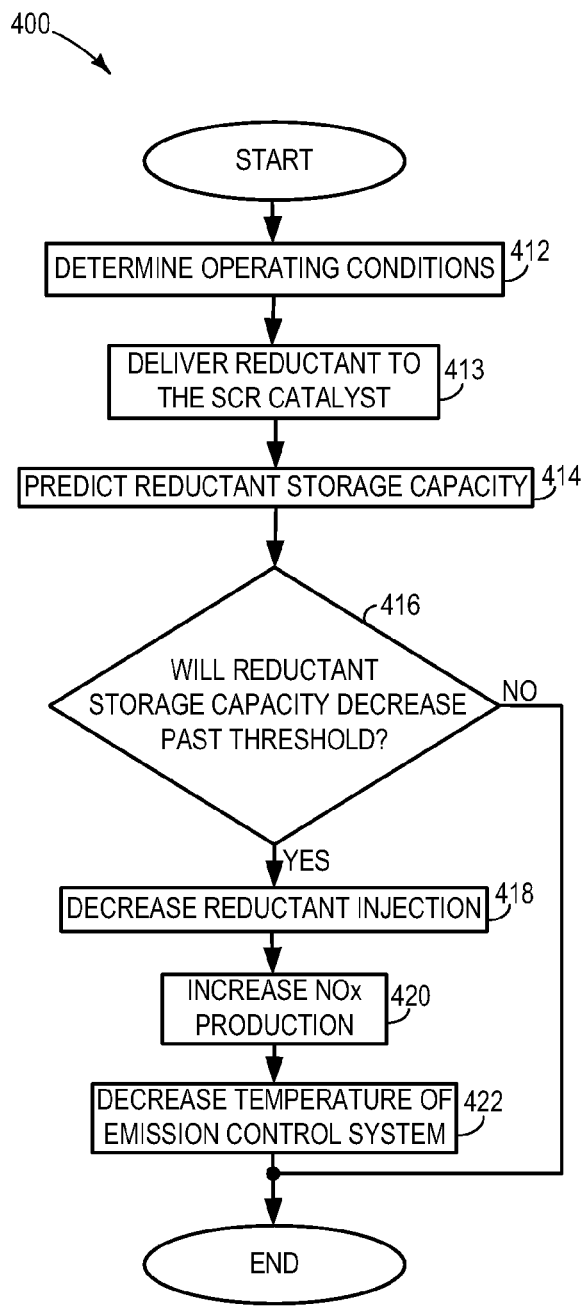
FIG. 3
FIG. 4

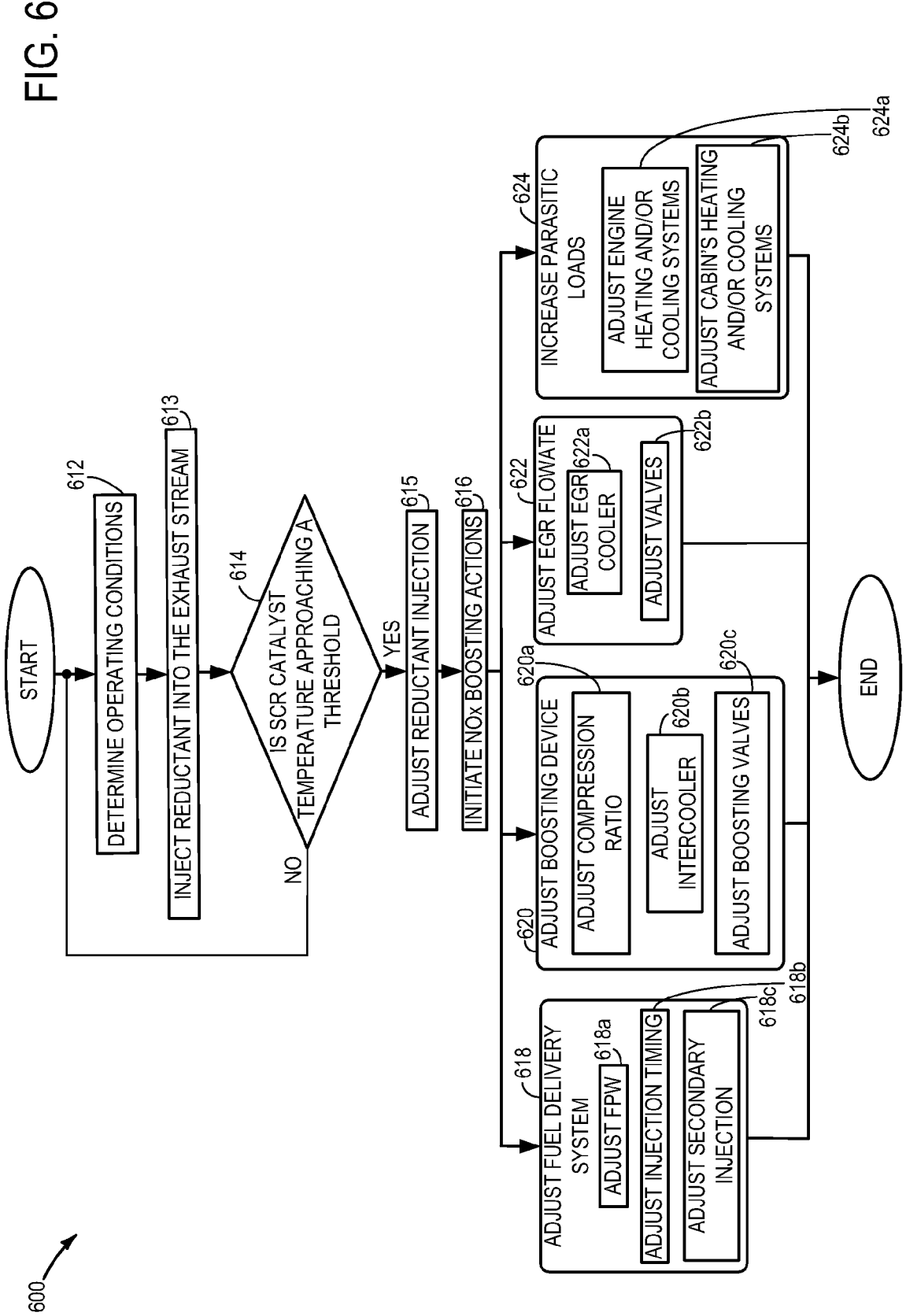

MANAGING REDUCTANT SLIP IN AN INTERNAL COMBUSTION ENGINE

BACKGROUND AND SUMMARY

Selective catalytic reduction (SCR) systems have been used to reduce automotive emissions. Such systems typically add a gaseous or liquid reductant, such as ammonia or urea, to the engine exhaust gas stream. The reductant may be absorbed onto a catalyst where the reductant reacts with nitrogen oxides in the exhaust gas to form water vapor and nitrogen. However, the storage capacity, as well as the absorption and desorption rates of the reductant into the catalyst, may fluctuate with temperature and other variables.

A release of unreacted reductant from an SCR catalyst may be referred to as reductant slip. Under some conditions, the amount of reductant stored in an SCR catalyst may be increased to boost the NOx conversion in the SCR system. However, during some operating conditions, such as transient operation, reductant slip may occur when the reductant storage capacity in the SCR catalyst drops below the amount of reductant stored.

A reductant slip may increase the amount of reductant released into the atmosphere. Furthermore, during or subsequent to a reductant slip, when an emission control device, such as a diesel particulate filter DPF, is located downstream of the SCR system, a reductant, such as ammonia, may be converted back to NOx due to the presence of platinum in the DPF. Therefore, reductant slip may increase emissions from the vehicle under some operating conditions.

Various approaches try to reduce or inhibit the amount of reductant injected into the exhaust stream to reduce reductant slip caused by desorption of reductant from SCR catalyst brick. For example, in U.S. Pat. No. 6,415,602, catalyst temperature is filtered using a variable time constant corresponding to current space velocity of the exhaust gas to account of the changes in the catalyst temperature attributed to NOx transient emissions. Therefore, the amount of reductant is metered on the basis of a filtered NOx concentration applied at a normalized stoichiometric ratio. In this way, the amount of reductant injected into the exhaust stream is adjusted based on the catalyst temperature. Specifically, as the storage ability of the catalyst decreases with temperature, the reductant is metered accordingly to reduce reductant slip.

However, reductant slip may occur regardless of the amount of reductant injected into the exhaust stream, and even when no reductant is injected. For example, the catalyst temperature may experience significant and rapid temperature changes based on various vehicle operating conditions, as well as the ambient conditions. Under the aforementioned conditions, the catalyst may experience reductant slip due to the correspondence between reductant storage capacity in the catalyst and catalyst temperature. For example, if the catalyst temperature changes, thereby changing the reducant storage capacity to below the current amount of stored reductant, the excess reductant can be released, even if no reductant is injected. Such changes can occur during either increasing or decreasing temperature, as changes in either direction can reduce storage capacity due to the non-linear relationship of storage capacity to temperature.

As such, in one approach, a method for controlling operation of vehicle system including an internal combustion engine and a catalytic emission control device coupled in an exhaust of the engine, the method including delivering, which may include injecting into the exhaust, reductant to the emission control device responsive to vehicle operating conditions, and increasing emission control device inlet-NOx in response to reductant release from the emission control device.

In this way, the exhaust reductant release from the catalyst may be reacted, decreasing emissions from the vehicle as well as decreasing inefficiencies in the system. In some examples, the amount of NOx produced in combustion may be increased until a sufficient amount of NOx is produced to react with the reductant released from the catalyst. Subsequent to the release of the reductant and the increase in NOx production, NOx production may be reduced to avoid increased emissions. However, if the storage capacity of the catalyst continues to drop, an increased amount of NOx will be produced. In this way, the NOx production corresponds to the amount of reductant released from the catalyst.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3 shows a high level feedback control which may be used to control reductant slip in the exhaust stream.

FIG. 4 shows a high level predictive control strategy which may be used control reductant slip in the exhaust stream.

FIG. 6 illustrates another example control strategy which may be utilized to control reductant slip in an internal combustion engine.

DETAILED SPECIFICATION

Figure 1:
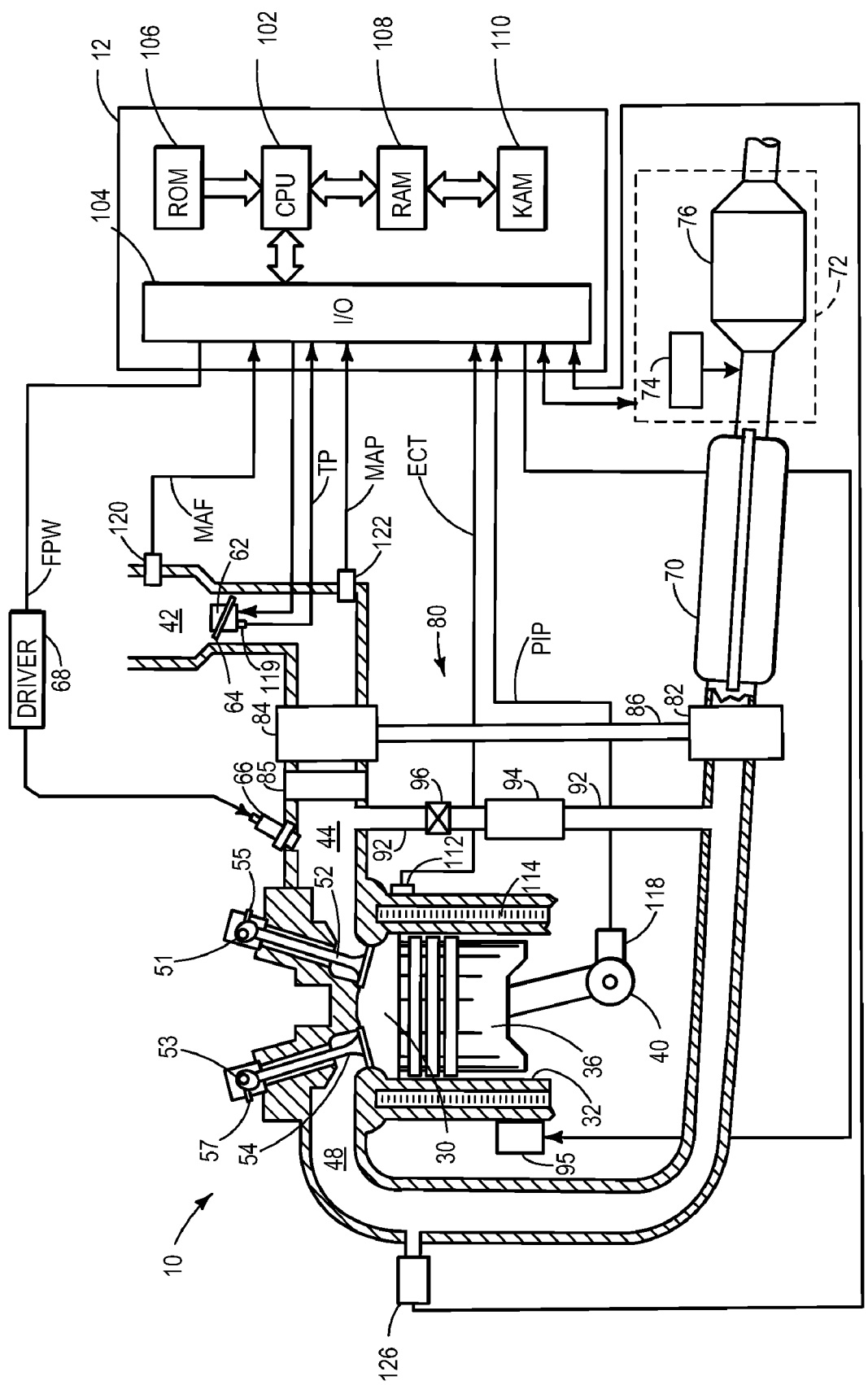
FIG. 1 shows a schematic depiction of an internal combustion engine.

Referring now to FIG. 1, internal combustion engine 10, comprising a plurality of combustion chambers and controlled by electronic engine controller 12, is shown. Combustion chamber 30 (e.g. cylinder) of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52, and exhaust valve 54. Fuel injector 66 is shown coupled upstream of the intake valve providing what is known as port injection. The fuel injector delivers liquid fuel directly therein in proportion to the pulse width of signal fpw received from controller 12 via conventional electronic driver 68. Additionally or alternatively the fuel injector may be directly coupled to the combustion chamber providing direct injection. Fuel is delivered to the fuel injector via a fuel system (not shown) including a fuel tank, fuel pumps, and a fuel rail. In some embodiments, engine 10 may include a plurality of combustion chambers each having a plurality of intake and/or exhaust valves. An engine block may house the combustion chambers.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, combustion chamber 30 may alternatively include an intake valve controlled via electric valve actuation and an exhaust valve controlled via cam actuation including CPS, VCT systems, and/or hydraulic or electro-hydraulic variable intake valve systems.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Further, in this particular example, the intake throttle is positioned upstream of a compressor 84, discussed in more detail herein. However, in other examples, the throttle may be positioned at another suitable location, such as downstream of the compressor. Intake passage 42 may include a mass air flow sensor 120 and a manifold air pressure sensor 122 for providing respective signals MAF and MAP to controller 12.

Controller 12 activates fuel injector 66 so that a desired fuel injection amount is provided. Further, controller 12 is configured to activate fuel injector 66 so that multiple fuel injections may be performed during a cycle. In one specific example, a common rail fuel injection system may be used.

Exhaust manifold gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, hydrocarbon (HC), or carbon monoxide (CO) sensor.

Catalytic converter 70 is shown in communication with exhaust manifold 48. In some embodiments, catalytic converter 70 may be a diesel oxidation catalyst. An emission control system 72 is shown downstream catalytic converter 70. Emission control system 72 may include reductant storage device 74 and emission control device 76. In some examples, emission control device 76 may be a catalytic emission control device such as a selective catalytic reduction SCR catalyst, also referred to as an SCR emission control device. Alternatively another suitable emission control device may be utilized. Emission control device 76 is shown in communication with catalytic converter 70. Reductant storage device 74 may supply a reductant to an exhaust stream entering emission control device 76. Emission control system 72 is described in more detail herein with regard to FIG. 2.

Controller 12 is shown in FIG. 1 as a microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 119; and absolute Manifold Pressure Signal MAP from sensor 122. Engine speed signal RPM is generated by controller 12 from signal PIP Controller 12 is configured to control emission control system 72. Further, emission control system 72 may send feedback to controller 12. This feature is described in more detail below. Further it can be appreciated that various temperature sensors, in communication with controller 12, may be coupled to various locations in the vehicle. Suitable temperature sensor locations may include: directly to the emission control device 76, upstream of the emission control device 76, downstream of the emission control device 76, directly to the vehicle's car body, etc.

Combustion in engine 10 can be of various types, depending on operating conditions. While FIG. 1 depicts a compression ignition engine, it will be appreciated that the embodiments described below may be used in any suitable engine, including but not limited to, diesel and gasoline compression ignition engines, spark ignition engines, direct or port injection engines, etc. Further, various fuels and/or fuel mixtures such as gasoline, diesel, bio-diesel, H2, ethanol, methane, and/or combinations thereof may be used.

In one embodiment, engine 10 may have a turbocharger 80, which has a turbine 82 coupled to the exhaust manifold 48 and the compressor 84 coupled to the intake manifold 44. Turbine 82 is coupled to compressor 84 via a drive shaft 86. Optionally, an intercooler 85 may be coupled downstream of the compressor to cool compressed intake air. A suitable intercooler, such as an air to air intercooler or a fluid (e.g. engine coolant, water, etc.) based intercooler, may be used.

In the turbocharged engine, desired torque may be maintained by adjusting various valves, such as a turbine wastegate (not shown) and/or compressor bypass valves (not shown). Various types of turbochargers and arrangements may be used. For example, a variable geometry turbocharger (VGT) may be used where the geometry of the turbine and/or compressor may be varied during engine operation by controller 12.

Alternately, or in addition, a variable nozzle turbocharger (VNT) may be used where a variable area nozzle is placed upstream and/or downstream of the turbine in the exhaust line (and/or upstream or downstream of the compressor in the intake line) for varying the effective expansion or compression of gasses through the turbocharger. Also, a twin turbocharger arrangement, and/or a sequential turbocharger arrangement, may be used if desired. In the case of multiple adjustable turbochargers and/or stages, a relative amount of expansion though the turbocharger may be varied, depending on operating conditions (e.g. manifold pressure, airflow, engine speed, etc.). Further, a mechanically or electrically driven supercharger may be used, if desired.

Further, in some examples an exhaust gas recirculation (EGR) system 91 coupled upstream of the intake valve and downstream of the exhaust valve having an EGR conduit 92, an EGR valve 96, and an optional EGR cooler 94 may be configured to direct exhaust gas to the intake manifold. In this way emission may be reduced under some operating conditions.

Additionally, an engine heating system 95, such as one or more glow plugs, may be included in the engine. The engine heating system may be configured to transfer heat to the engine, prior to ignition. In this example, the engine heating system is coupled directly to the combustion chamber walls. In other examples, the engine heating system may be coupled to another suitable location.

An engine cooling system (not shown), such as a radiator, may be included in the engine. The engine cooling system may be configured to transfer heat away from the engine during operation. Additionally, a cabin heating and/or cooling system (not shown) may be included in the vehicle. The cabin heating system and the cabin cooling system (e.g. air conditioning system) may be configured to adjust the temperature of the cabin of the vehicle. As discussed herein, adjusting a device, system, etc., such as the heating and cooling system, in some examples includes turning the device on or off, as well as adjusting a level of actuation of the device.

Figure 2:
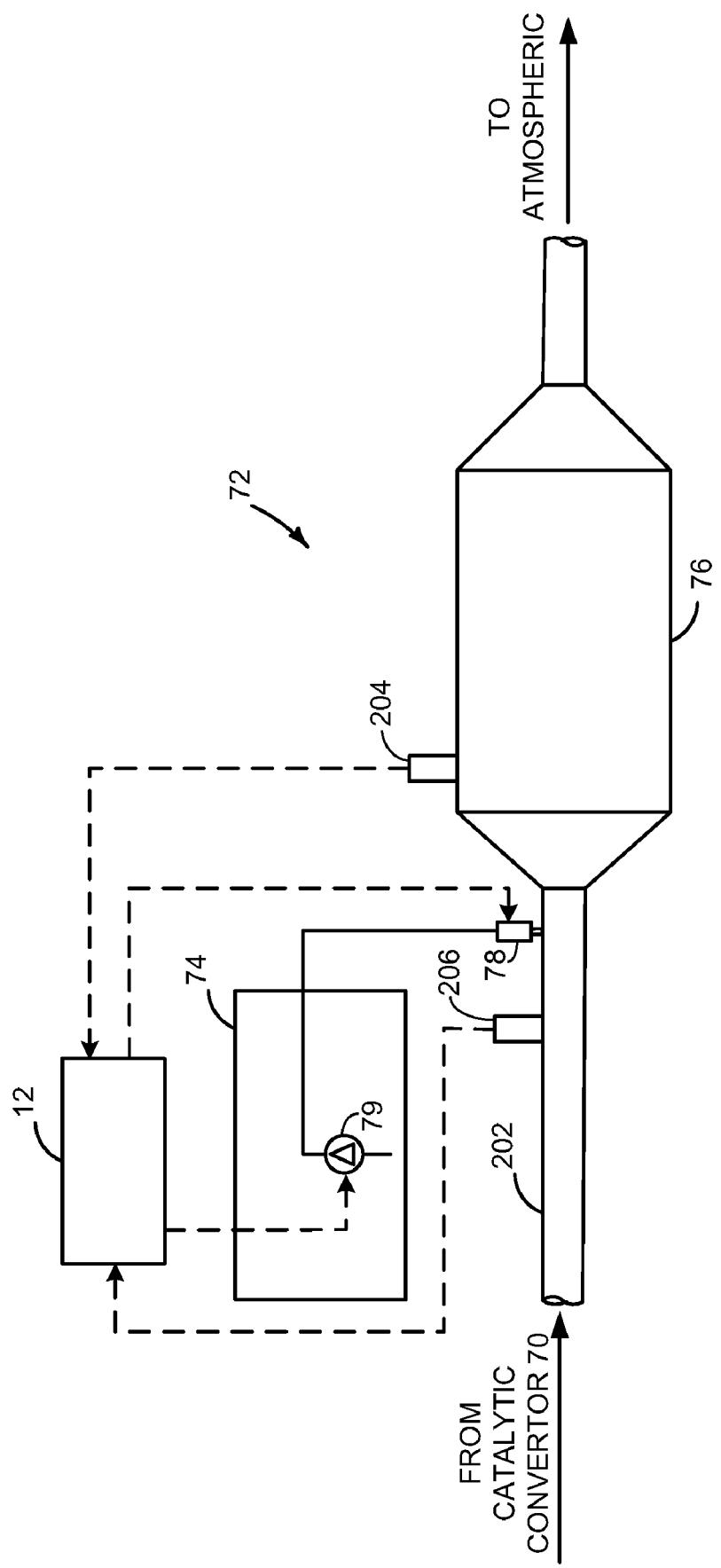
FIG. 2 shows a schematic depiction of an emission control system included in the internal combustion system illustrated in FIG. 1.

FIG. 2 shows an example of emission control system 72 of engine 10 in more detail. Generally, the components described herein may operate to supply a reductant to exhaust conduit 202. In particular, emission control system 72 may supply a mist or spray from of a reductant or reductant-containing liquid stored in a reductant storage device 74. Further, emission control system 72 may include controller 12 configured to control the selective generation and supply of the stored reductant to the exhaust system.

Reductant storage device 74 may be an on-board storage device for storing the reductant. In particular, the reductant storage device may store an aqueous urea solution supplied by a vehicle operator, for example, although various other reductants may be used. Moreover, other forms of reductant may be utilized. For example, a gaseous reductant or solid pellets of urea may be utilized for reductant injection into the emission control system. In another example, hydrocarbons, which may be produced in combustion, may be used as a reductant for a hydrocarbon SCR.

Emission control system 72 may further include a reductant pump 79 and a reductant injector, coupled to an exhaust conduit 202 upstream of emissions control device 76 (e.g. SCR catalyst). The reductant pump may be configured to increase the pressure downstream of the pump. The reductant injector may be configured to adjust the amount of reductant introduced into the exhaust conduit. It can be appreciated that alternate configurations may be utilized to introduce reductant into the exhaust stream. A temperature sensor 204 may be coupled directly to emission control device 76 and electronically coupled to controller 12. Additionally or alternatively temperature sensor 206 may be coupled to exhaust conduit 202, upstream of the SCR catalyst.

Under some conditions, reductant from reductant storage device 74 may be supplied to exhaust conduit 202. Accordingly, when such conditions are detected, the controller may prompt emission control system 72 to release an amount of reductant from the reductant storage device so as to substantially reduce NOx exiting emission control device 76. As such, reductant from the reductant storage device may be absorbed in emission control device 76 to reduce NOx in the exhaust stream.

Urea solution stored in reductant storage device 74 may decompose to ammonia, whereby ammonia may convert NOx at emission control device 76. Further, urea may be decomposed to ammonia at various locations between reductant storage device 74 and emission control device 76. In one embodiment, urea solution may be decomposed to ammonia prior to entering exhaust conduit 202. For example, heat may be applied to the urea solution stored in reductant storage device 74 so as to produce ammonia. In another example, the stored urea solution may be agitated so as to release ammonia prior to entering exhaust conduit 202. As such, ammonia may be introduced to exhaust conduit 202 to reduce NOx.

However, under some conditions, it may be desirable to introduce urea solution to exhaust conduit 202 instead of ammonia. In particular, urea solution may be delivered to exhaust conduit 202, for example, to reduce power consumed from generating ammonia. Alternately, for example, heat from the exhaust stream of the engine may facilitate decomposition of urea introduced to exhaust conduit 202.

Fluctuations in temperature may affect the reductant storage capacity in the SCR catalyst. In one particular example, rapid temperature changes can cause reductions in the reductant storage capacity to such a degree that the storage capacity falls below the actual amount of stored reductant. In such cases, the excess stored reductant is released, even if no reductant is injected. To at least partially address this situation, various adjustments can be made to the engine operation, such as to increase NOx production during such conditions to thereby react with the released reductant and reduce reductant slip. In this way, the inlet-NOx into the catalyst may be increased, reacting at least a portion of the released reductant, where the inlet-NOx includes the amount of NOx entering emission control device 76.

Figure 5:
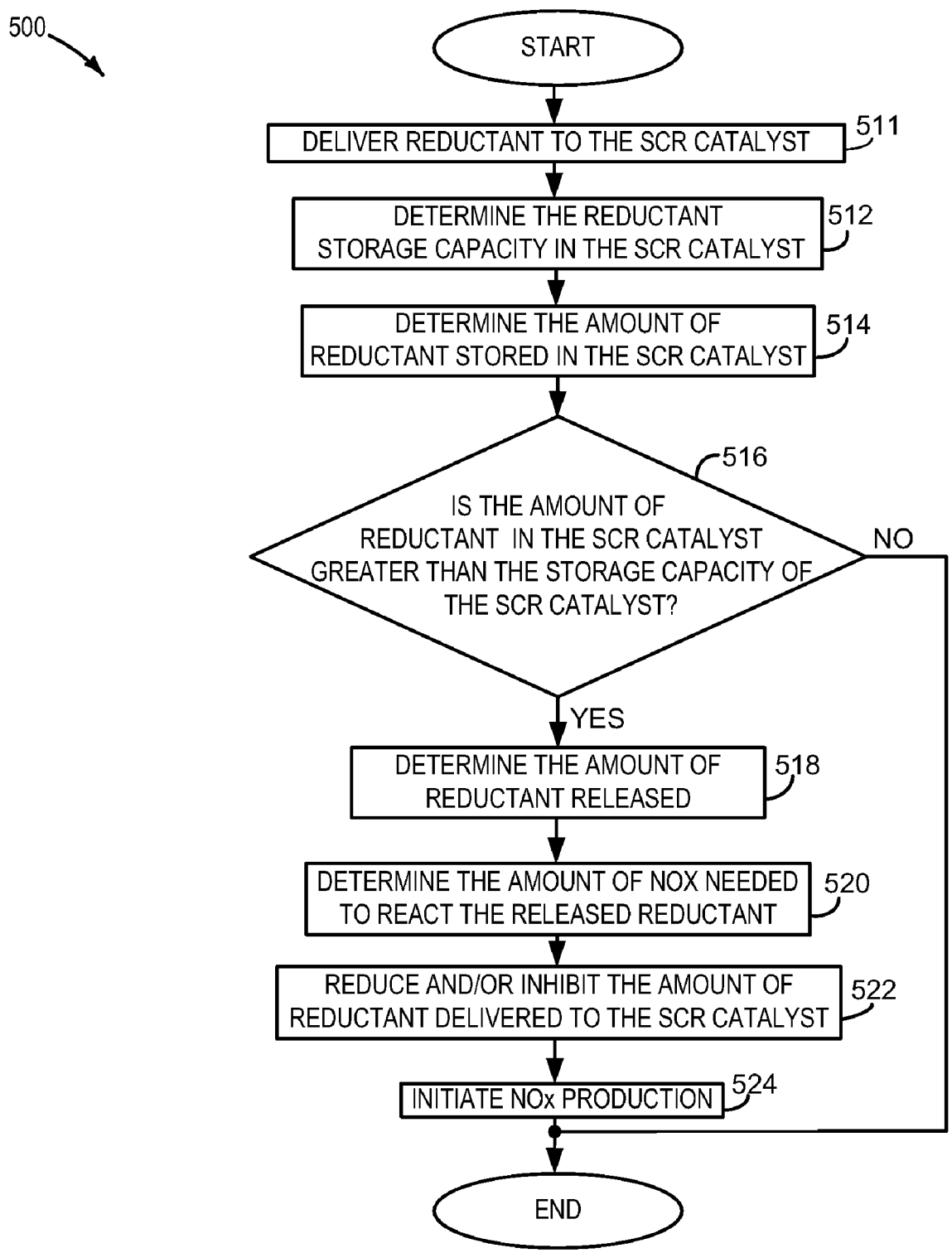
FIG. 5 illustrates an example control strategy which may be utilized to control reductant slip in an internal combustion engine.

FIGS. 3-6 illustrate various control strategies which may be implemented, allowing rapid consumption of a reductant in an emission control system in response to various operating conditions of the engine and/or the vehicle. The aforementioned control strategies may be carried out during transient and/or steady state conditions. Specifically FIG. 3 shows a feedback type control strategy, FIG. 4 shows a predictive control strategy, FIG. 5 shows a control strategy which adjusts the level of NOx production based on the amount (e.g. level) of reductant released or the anticipated amount of reductant release from the SCR catalyst, and FIG. 6 demonstrates various actions which may be performed within the engine to increase the NOx produced in combustion and react any excess reductant which may be released, as well as decrease the temperature of the emission control system to reduce the amount of reductant released into the exhaust stream from the catalyst. It can be appreciated that the control strategies shown in FIGS. 3-6 may be implemented utilizing the systems and component described above. Alternatively, the control strategies may be implemented utilizing other suitable systems and components.

In one example, the NOx increase used to react with the reductant may be proportional to the amount of reductant which is released, or will be released, into the exhaust stream from the SCR catalyst. In this way, excess NOx is created to chemically reduce excess reductant which may be stored in or released from the SCR catalyst into the exhaust stream due to temperature-related catalyst storage capacity reductions. Furthermore, increased emissions may be reduced due to the correlation between NOx production and reductant slip. In some examples, thermal aging of the catalyst may also be taken into account when adjusting engine operation to better match the release rate or the predicted release rate of the reductant from the catalyst.

FIG. 3 illustrates a control strategy 300 which may be implemented to reduce reductant slip. Specifically, the engine may be adjusted to increase NOx production to react with the reductant released (which may include an anticipated amount of reductant that may be released) from an SCR catalyst due to various operating conditions such as a temperature increase.

At 312 the method includes determining the operating conditions in the vehicle and/or engine. The operating conditions may include: ambient temperature, engine temperature, emission control system temperature, exhaust gas composition, air fuel ratio, throttle position, valve position, etc. The method then advances to 313 where reductant is delivered to the SCR catalyst responsive to vehicle operating conditions. Delivery of reductant may include injecting reductant into the exhaust stream upstream of the SCR catalyst.

The method then proceeds to 314 where it is determined if the temperature of the SCR catalyst is approaching a threshold temperature. Alternatively, it may be determine if the desorption rate or release rate of reductant from the SCR catalyst has surpassed a threshold value.

Figure 8:
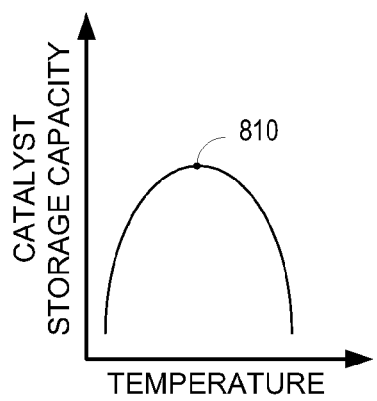
FIG. 8 illustrates graphically how the reductant storage capacity of the catalyst varies with the catalyst temperature.

The storage capacity of the SCR catalyst may be proportional to the temperature of the SCR catalyst, such as described with regard to FIG. 8, which illustrates how the reductant storage capacity in the SCR catalyst may vary with the temperature of the SCR catalyst. In this example, as the temperature increases, the storage capacity increases until it reaches a threshold value 810, at which point the reductant storage capacity of the SCR catalyst starts to decrease. It can be appreciated that the graph depicted in FIG. 8 is exemplary in nature.

Returning to FIG. 3, the threshold temperature may correspond to a specified reductant release rate. In one example, the threshold temperature may correspond to the temperature at which the reductant storage capacity of the catalyst falls below the amount of reductant stored in the catalyst. In another example, the desorption rate or the threshold temperature may be calculated utilizing a number of variables which may include: vehicle and/or ambient temperature, ambient humidity, air fuel ratio, current reductant storage levels, current reductant storage capacity, exhaust gas composition, etc. Further still, in other examples, the threshold temperature may correspond to a temperature at or above which the probability of reductant release occurring at some subsequent time has increased beyond a threshold value. In this way there may be a margin between a temperature at which reductant is released into the exhaust stream and the threshold temperature.

The method then advances to 316, where the amount of reductant injected (e.g. sprayed) into the exhaust stream is reduced. In one example, reducing may include stopping and/or inhibiting injection of the reductant.

Next, the method advances to 318 where the NOx produced by the combustion process in the engine is increased. In turn, the inlet-NOx is increased. Actions used to increase NOx production are discussed in more detail herein, and may include, for example, reducing EGR levels, adjusting cam timing, advancing injection timing, etc. In this way, a sufficient amount of NOx is produced to react the reductant released from the catalyst and/or consume excess reductant in the catalyst, where the excess reductant in the catalyst may include an amount of stored reductant whose release is forecasted at some subsequent time. Therefore, improved operation is achieved via a reduction in reductant slip and therefore emissions. In one example, increased NOx production may be proportional to the amount of reductant released from the catalyst to reduce overly increased NOx emissions.

Next, at 320, the method may include adjusting the temperature of the emission control system. For example, the temperature of the exhaust gas may be temporarily reduced to reduce further lowering of storage capacity and thus further reductant release. After 320 the method may end. However, in some examples, the method may return to the start.

FIG. 4 illustrates an alternative control strategy 400 which may be implemented to increase the NOx produced in the engine in response to a change and/or anticipated change in a storage capacity of an SCR catalyst. In this way the reductant stored on or in the SCR catalyst may be reacted by the increased NOx. Various parameters may be utilized to determine the storage capacity such as the temperature of the SCR catalyst, humidity, etc. In particular, FIG. 4 shows a predictive control strategy which may be implemented to anticipate reductant slip and react the excess reductant via increased NOx production, thereby reducing the amount of reductant released into the atmosphere or converted back to NOx when an emission control device, such as a diesel particulate containing platinum, is positioned downstream of SCR catalyst. In some examples, the reductant stored in or on the SCR catalyst may be reacted by the increased NOx before it is released into the exhaust stream, reducing reductant slip.

At 412, method 400 includes determining the operating conditions in the vehicle and/or engine. The operating conditions may include: ambient temperature, engine temperature, emission control system temperature, exhaust gas composition, air fuel ratio, throttle position, valve position, NOx storage level, etc. The method then advances to 413 where reductant is delivered to the SCR catalyst responsive to engine and/or vehicle operating conditions. Delivery of reductant may include injecting reductant into the exhaust stream, upstream of the SCR catalyst. Next, at 414, the method includes predicting the reductant storage capacity of the SCR catalyst. Several variables including exhaust temperature, engine temperature, exhaust gas flowrate, exhaust gas composition, ambient temperature, etc., may be used to calculate the predicted storage capacity.

Next, the routine advances to 416 wherein it is determined if the reductant storage capacity of the SCR catalyst will decrease past a threshold value. In some examples, it is determined if the reductant desorption rate of the SCR catalyst will increase past a threshold value or if the temperature of the SCR catalyst will increase beyond a threshold value. Further still, a threshold probability may be used to carry out the aforementioned determinations.

The method then proceeds to 418 where the amount of reductant which is injected into the exhaust stream is decreased. Next the method advances to 420, where the NOx produced in combustion is increased to react the reductant released by the SCR catalyst and/or the excess reductant stored in the SCR catalyst. The amount of NOx produced may be proportional to the amount of reductant released from the SCR catalyst and/or the excess reductant stored in the catalyst. In this way excess NOx production may be avoided, decreasing the chance of an increase in emissions.

The method advances to 422 where actions are taken to decrease the temperature of the exhaust stream. These aforementioned actions may include adjustment of the fuel delivery system, adjustment of the boosting system (e.g. turbocharger), etc.

FIG. 5 shows still another alternative control strategy which may be utilized to counteract reductant slip in an emission control system, thereby decreasing the amount of reductant release from the emission control system.

First at 511, reductant is delivered to the SCR catalyst responsive to vehicle and/or engine operating conditions. Next, at 512, the reductant storage capacity in one or more of the catalyst bricks is calculated. Several variables including an engine temperature, exhaust temperature, exhaust gas flowrate, and exhaust gas composition may be utilized to calculate the reductant storage capacity. In particular, changes in exhaust and/or the SCR catalyst temperature may cause the reductant storage capacity to change (e.g. decrease) significantly, as noted herein. In other examples a target amount of reductant stored in the SCR catalyst may be calculated. Next, at 514, the amount of reductant stored in one or more of the SCR catalyst bricks is calculated. In some examples, a history of the injected reductant may be used to calculate the stored reductant. At 516, it is determined if the amount of reductant stored in the SCR catalyst is greater than the reductant storage capacity of the SCR catalyst. In other examples, it may be determined if the difference or deviation between the reductant stored in the SCR catalyst and the target amount of reductant stored in the SCR catalyst has exceeded a threshold value.

If the amount of reductant stored in the SCR catalyst is not greater than the storage capacity of the SCR catalyst or the difference between amount of reductant stored in the SCR catalyst and the target amount of reductant stored has not surpassed a threshold value, it is determined that reductant will not or is not being released from the SCR catalyst and the routine ends.

However, if the amount of reductant stored in the SCR catalyst is greater than the storage capacity of the SCR catalyst or the difference between amount of reductant stored in the SCR catalyst and the target amount of reductant stored has surpassed a threshold value, reductant is determined to be released from the SCR catalyst due to the decrease in storage capacity or anticipated decrease in storage capacity. The decrease in storage capacity may be proportional to an increase in the temperature of the SCR catalyst. Therefore, when the amount of reductant stored in the catalyst is greater than the storage capacity or anticipated storage capacity (e.g., reductant is being or will be released from the catalyst) the routine advances to 518 where the amount and/or anticipated amount of reductant released from the SCR catalyst is calculated. Additionally or alternatively, the release rate of the reductant from the SCR catalyst may be calculated. Various parameters may be used to calculate the amount and/or anticipated amount of reductant released from the SCR catalyst and/or reductant release rate (e.g. desorption rate) of the SCR catalyst.

Next, the routine proceeds to 520 where the amount of NOx for reacting the released reductant or predicted released reductant is calculated. Subsequently, the amount of reductant delivered to the SCR catalyst is reduced and/or inhibited at 522 and the production of the required NOx is initiated at 524. Initiation may include actuating various valves in the engine and/or sending various control signals to operating systems in the vehicle.

In this way, the released reductant or anticipated released reductant may be reacted by the increased NOx production. Further, the amount of additional NOx produced by the engine can be proportional to the amount of reductant released from the catalyst, and the additional NOx may be used to react the excess reductant and thereby counteracting reductant slip. In some examples, the amount of NOx produced is proportional to the amount of reductant released.

FIG. 6 illustrates a control strategy 600 which may be implemented to reduce and react the released reductant in the exhaust stream from the catalyst brick(s) and/or react an excess amount of reductant anticipated to be released from the catalyst brick(s). In particular FIG. 6 illustrates a number of different actions which may be implemented concurrently or in succession to reduce the amount of reducant released to the atmosphere from the exhaust stream while maintaining, or in some examples decreasing, emission levels.

First at 612 the operating conditions of the vehicle and/or engine may be determined. Next at 613, reductant is injected into the exhaust stream responsive to vehicle and/or engine operating conditions. At 614, it is determined if the SCR catalyst temperature is at or approaching a threshold temperature. As discussed above, the SCR catalyst temperature may be proportional to the reductant storage capacity of the SCR catalyst. Therefore, the threshold temperature may correspond to a temperature above which the SCR catalyst may release reductant or is approaching a release of reductant. In one example, the threshold temperature may be determined based on various operating conditions including the catalyst compositions, exhaust gas flowrate, etc.

At 615 the method may include adjusting the amount of reductant injection into the exhaust stream upstream of the SCR catalyst. Adjusting the amount of reductant injected into the exhaust stream may include inhibiting or substantially decreasing the amount of reductant injected into the exhaust stream via actuation of a reductant pump and/or a reductant injector.

At 616, NOx boosting actions may be initiated, such as the NOx boosting actions included in 618-624. Some of the NOx boosting actions may reduce the exhaust temperature, which may work in conjunction with the increased NOx production to delay the onset and/or severity of the reductant released from the catalyst. In this way, excess reductant stored in the catalyst, corresponding to a predicted reductant slip, may be reacted by a NOx increase. Additionally or alternatively a released amount of reductant, corresponding to a reductant slip may be reacted by a NOx increase. Blocks 618-624 may increase the level of NOx production to react the reductant released from the SCR catalyst due to an increase in temperature or react excess reductant in the catalyst, corresponding to an anticipated reductant slip due to an increase in temperature. It can be appreciated that the actions described in blocks 618-624 may be implemented substantially concurrently, asynchronously, or in succession (e.g. sequentially). The actions described in blocks 616-624 may be referred as NOx boosting actions or SCR catalyst inlet-NOx boosting actions. Furthermore, some of the following actions may be excluded in some embodiments to increase the efficiency of the control strategy, as well as to limit the amount of NOx produced to maintain or decrease emissions directed to the atmosphere from the emission control system. Furthermore, the magnitude of the following actions may be proportional to the amount of reductant stored in the catalyst, the reductant storage capacity of the catalyst, and/or the release rate or release level of the reductant from the catalyst. Therefore, increased emission due to excess NOx production may be avoided.

At 618, the method may include adjusting various aspects of the fuel delivery system. Adjusting the fuel delivery system may include adjusting the fuel pulse width FPW 618a, injection timing 618b, adjusting or implementing a secondary injection 618c, adjusting the valve timing, adjusting the fuel injection pressure, etc. The secondary injection, such as a pilot or post injection, may include a secondary injection of a second type of fuel. The second type of fuel may be a knock reducing substance.

At 620, the method may include adjusting a boosting device which may include a supercharger, turbocharger, etc. Adjustment of the boosting device may include decreasing the compression ratio via adjustment of the compressor and/or turbine 620a, adjustment of the intercooler 620b, adjustment of various valves (e.g. wastegate) associated with the boosting system 620c, etc.

At 622, the method may include adjusting the EGR flowrate. Adjusting the EGR flowrate includes adjusting the EGR cooler 622a, decreasing the amount of EGR via actuation of one or more valves associated with the EGR system 622b, etc.

At 624 the method may include increasing the parasitic load on the system via an auxiliary system. Increasing the parasitic loads may include adjusting the engine heating and/or cooling systems 620a, adjusting the cabin heating and/or cooling systems 620b (e.g. air conditioner), adjusting a fan, adjusting one or more glow plugs, adjusting a fuel pump, etc.

Figure 7D:
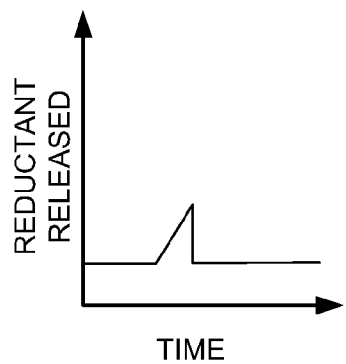
FIG. 7A-7D illustrate graphically how NOx production may be increased in response to a release of reductant in the exhaust stream.
Figure 7C:
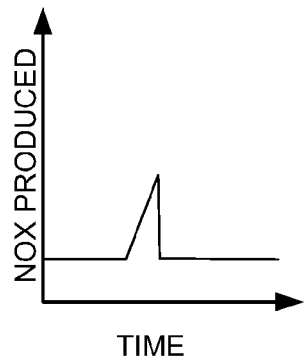
Figure 7B:
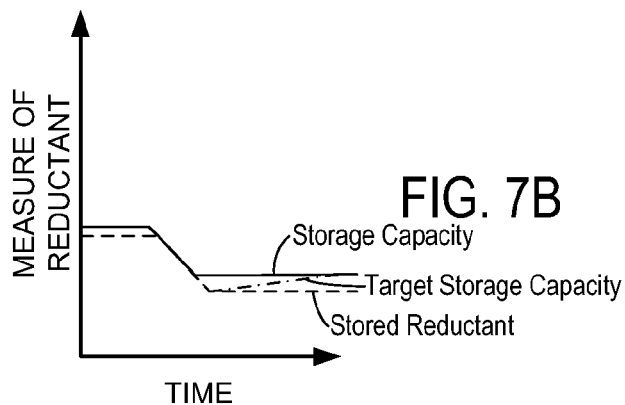
Figure 7A:
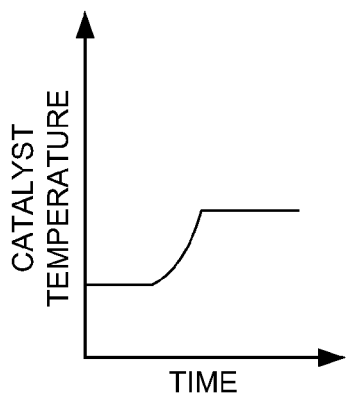

FIGS. 7A-7D illustrate the correlation between catalyst temperature, reductant storage capacity in an SCR catalyst, and the NOx produced in combustion. Specifically FIG. 7A shows a graph of the temperature of an SCR catalyst included in an engine. FIG. 7B shows a decrease in the reductant storage capacity in the SCR catalyst as the temperature increases. Therefore, when the reductant storage capacity surpasses a threshold value, reductant may be released into the exhaust, depending on the actual amount of reductants stored in the SCR catalyst at that time. Furthermore, an exemplary target storage capacity is shown in FIG. 7B. The target storage capacity may initially track the storage capacity within a predetermined range. Subsequently, at some time interval after a decrease in the storage capacity, the target storage capacity may be lower than the storage capacity, after which time the target storage capacity is increased until the target storage capacity tracks the storage capacity within a predetermined range. To counteract released reductant and/or an anticipated release in reductant, NOx production in the engine is increased, as shown in FIG. 7C, to react an amount of reductant proportional to what may otherwise be released from the SCR catalyst. It can be appreciated the amount of NOx produced in combustion may be increased in response to an increase in the release rate of reductant from the SCR catalyst or an increase in temperature of the SCR catalyst. FIG. 7D shows an amount of reductant which may be released due to a rapid increase in exhaust temperature. However, it can be appreciated that under some conditions reductant may not be released and an increase in NOx production may still be implemented to react reductant on or in the catalyst responsive to a predicted reductant release.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling operation of a vehicle system including an SCR catalyst coupled in an engine exhaust, comprising:

delivering reductant to the catalyst responsive to vehicle operating conditions; and increasing catalyst inlet-NOx in response to a reductant release from the catalyst, the inlet-NOx increased proportionally to an amount of reductant released based on a degree to which reductant storage capacity falls below an amount of reductant currently stored, and based on a reductant desorption rate of the catalyst; and stopping reductant delivery responsive to the reductant release.

2. The method of claim 1 where inlet-NOx is increased by adjusting fuel injected to an engine cylinder.

3. The method of claim 1 where inlet-NOx is increased by decreasing an exhaust gas recirculation.

4. The method of claim 1 where inlet-NOx is increased by increasing a parasitic engine load via an auxiliary system or increasing boost of a boosting system to increase NOx produced in combustion.

5. The method of claim 1 wherein the catalyst is an SCR catalyst and the reductant is urea.

6. The method according to claim 1 wherein the reductant is delivered in an engine cylinder and the catalyst utilizes hydrocarbon selective catalytic reduction.

7. The method of claim 1, wherein the inlet-NOx increase is further based on thermal aging of the catalyst.

8. A method for controlling operation of a vehicle system including a diesel internal combustion engine and an SCR emission control device coupled in an exhaust of the engine, the method comprising:

injecting urea to the SCR emission control device responsive to vehicle operating conditions, where at least a portion of the injected urea is stored as a reductant in the SCR emission control device;

when temperature of the SCR emission control device changes such that a reductant storage capacity of the SCR emission control device falls below a current level of reductant stored in the SCR emission control device, an engine operating parameter is adjusted in response to an amount by which the reductant storage capacity falls below the current level of reductant and a reductant desorption rate of the SCR emission control device, the engine operating parameter adjusted to increase emission control device inlet-NOx to react with reductant otherwise exiting the SCR emission control device; and further stopping injection of urea responsive to a reductant release occurring when temperature of the SCR emission control device changes such that the reductant storage capacity of the SCR emission control device falls below the current level of reductant stored in the SCR emission control device, wherein the engine operating parameter is adjusted such that inlet-NOx is increased proportionally to an amount of reductant released based on a degree to which the reductant storage capacity of the SCR emission control device falls below the current level of reductant stored in the SCR emission control device, and based on the reductant desorption rate.

9. The method of claim 8 where inlet-NOx is increased by adjusting fuel injected to the engine.

10. The method of claim 8 where inlet-NOx is increased by decreasing an exhaust gas recirculation.

11. The method of claim 8 where inlet-NOx is increased by increasing a parasitic load on the engine via an auxiliary system coupled to the engine.

12. The method of claim 8, wherein adjusting the engine operating parameter is further based on thermal aging of the catalyst.

13. The method of claim 8, wherein the relationship of the reductant storage capacity of the SCR emission control device to the temperature of the SCR emission control device is non-linear.

14. An internal combustion engine system comprising:
a cylinder having an intake and an exhaust;
an emission control system including a reductant delivery system coupled downstream of the cylinder and an SCR catalyst coupled downstream of the cylinder; and
a control system configured to determine SCR catalyst reductant storage capacity based on SCR temperature and adjust injection of a reductant, via the reductant delivery system, into the emission control system responsive to one or more engine operating conditions, stop the reductant injection into the emission control system responsive to an increase in SCR temperature sufficient to decrease an SCR catalyst reductant storage capacity below a current amount of stored reductant, and increase NOx produced in combustion in response to an amount of reductant released due to the decrease in capacity below the current amount of stored reductant in the SCR catalyst and a reductant desorption rate of the SCR catalyst.

15. The system of claim 14 where the control system is further configured to determine a current amount of stored reductant based on operating conditions and a history of injected urea.

16. The system of claim 14 wherein a fuel injection profile and/or timing is adjusted by the control system to increase NOx.

17. The system of claim 14 further comprising a boosting system coupled upstream of the cylinder.

18. The system of claim 17 wherein the control system adjusts the boosting system to increase NOx produced in combustion.

* * * * *